(12) United States Patent
Vasko et al.

(10) Patent No.: US 8,606,928 B2
(45) Date of Patent: Dec. 10, 2013

(54) DIVERSE NETWORK RELATIVE ADDRESSING RESOLUTION

(75) Inventors: David A. Vasko, Solon, OH (US); Raymond J. Staron, Chagrin Falls, OH (US); Charles Martin Rischar, Chardon, OH (US); Kenwood H. Hall, Hudson, OH (US); Subbian Govindaraj, Solon, OH (US); Robert J. Kretschmann, Bay Village, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 713 days.

(21) Appl. No.: 12/266,912

(22) Filed: Nov. 7, 2008

(65) Prior Publication Data

US 2010/0121799 A1 May 13, 2010

(51) Int. Cl.
*G06F 15/16* (2006.01)

(52) U.S. Cl.
USPC .................................. 709/227; 706/45; 726/1

(58) Field of Classification Search
USPC .................................. 709/227; 706/45; 726/1
See application file for complete search history.

(56) References Cited

U.S. PATENT DOCUMENTS

| | | | |
|---|---|---|---|
| 5,822,759 A * | 10/1998 | Treynor | 711/134 |
| 5,832,406 A | 11/1998 | Iwami et al. | |
| 6,198,933 B1 | 3/2001 | Lundin | |
| 6,345,266 B1 * | 2/2002 | Ganguly et al. | 707/999.001 |
| 6,487,496 B2 | 11/2002 | Katayama et al. | |
| 6,487,497 B2 | 11/2002 | Khavakh et al. | |
| 6,784,832 B2 | 8/2004 | Knockeart et al. | |
| 6,857,016 B1 | 2/2005 | Motoyama et al. | |
| 7,089,110 B2 | 8/2006 | Pechatnikov et al. | |
| 7,149,625 B2 | 12/2006 | Mathews et al. | |
| 7,295,556 B2 | 11/2007 | Roese et al. | |
| 7,379,811 B2 | 5/2008 | Rasmussen et al. | |
| 7,898,978 B2 * | 3/2011 | Dinges et al. | 370/254 |
| 2003/0061384 A1 * | 3/2003 | Nakatani | 709/245 |
| 2004/0165544 A1 * | 8/2004 | Cornett et al. | 370/254 |
| 2005/0080586 A1 * | 4/2005 | Kanevsky et al. | 702/127 |
| 2005/0169248 A1 * | 8/2005 | Truesdale et al. | 370/352 |
| 2006/0293850 A1 * | 12/2006 | Ahn et al. | 701/213 |
| 2007/0061455 A1 * | 3/2007 | Callaghan | 709/225 |
| 2008/0122686 A1 * | 5/2008 | Wirola | 342/357.02 |

\* cited by examiner

*Primary Examiner* — Thomas Dailey
(74) *Attorney, Agent, or Firm* — Turocy & Watson, LLP; Scott Speroff; John M. Miller

(57) ABSTRACT

A requesting entity can submit a query to an industrial control configuration to determine a location for a module. A distributed directory can be employed to discover an absolute location of the module, which can be provided to the requesting entity. This discovery can occur in real-time such that an answer can be given with a relatively high degree of certainty. In addition to providing the absolute address in the answer, a path on how to reach the module can be provided. The path can be optimized in order to allow quicker response time and to manage system resources.

17 Claims, 10 Drawing Sheets

DIVERSE NETWORK RELATIVE ADDRESSING RESOLUTION

TECHNICAL FIELD

The subject specification relates generally to industrial control systems and in particular to resolving queries upon these systems through use of a distributed directory.

BACKGROUND

Industrial control environments can typically involve complex mechanical, electronic, electro-mechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, for instance (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, when a request is made to an industrial control configuration on the location of an entity, a response is provide with a relative address (e.g., an address based upon location relative to another entity). This can be problematic in a configuration that experiences dynamic changes such that relative addresses change and quickly become outdated. A number of different innovations can be used to provide accurate and useful information to a requesting entity.

A request can be evaluated and through use of a directory (e.g., distributed directory) an absolute address of a unit can be provided. In addition, various metadata pertaining to the unit can be provided, including a path to reach the unit. To improve accuracy of information (e.g., the absolute address, the path, the metadata, etc.), a response to the request can be resolved in real-time. To enable fast response times, addresses of units that are frequently requested can be retained in a cache to facilitate faster response times.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
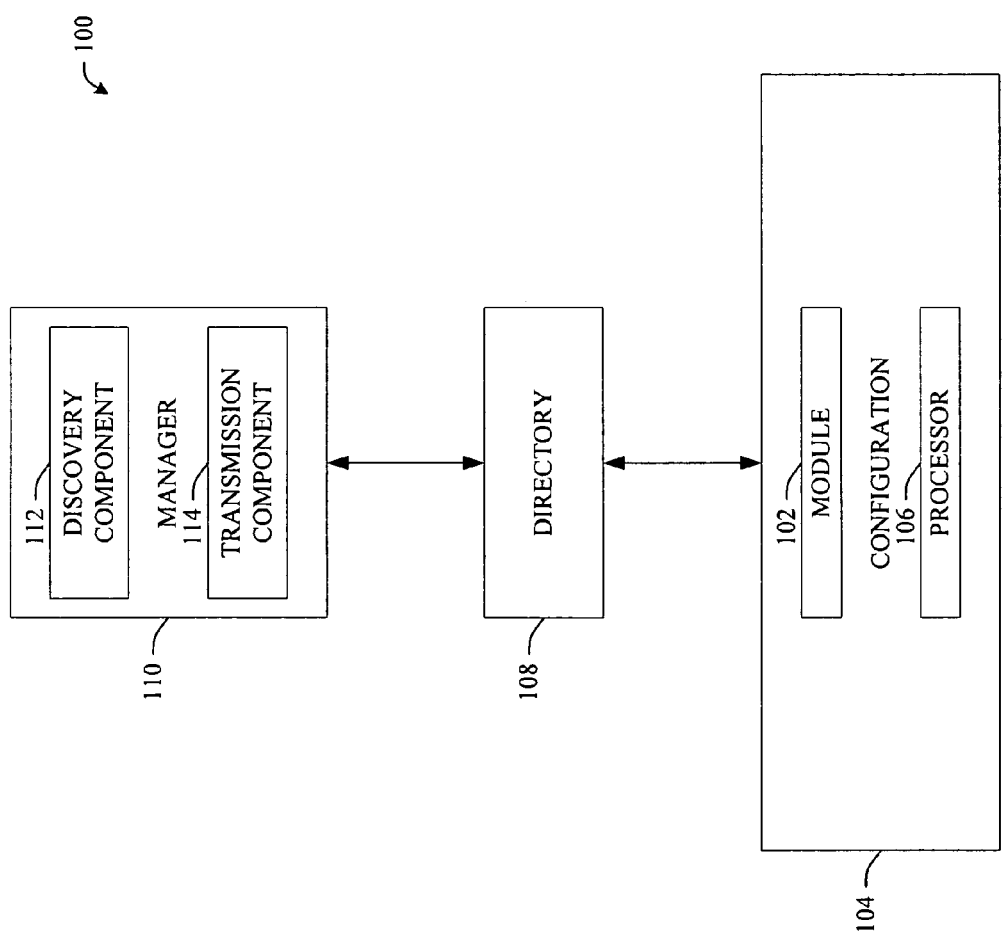
FIG. 1 illustrates a representative absolute address determination configuration with use of a directory in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 is disclosed for providing an address to a module 102 of an industrial control configuration (e.g., configuration 104). A conventional industrial control configuration can include a number of different modules (e.g., controllers, physical entities such as mixers, etc.) that arrange in a particular manner in order to perform a process. Different entities can make a request to learn an address of a particular module; in a classical setting, a relative address is supplied for a module. With a relative address, an address is provided in relation to another entity and thus is dependent upon the entity. For example, in the configuration 104, an address provided for the module 102 can be in relation to a processor 106 (e.g., the module 102 is x distance from the processor 106).

Use of a relative address implementation can be problematic, especially in configurations that are dynamic in nature (e.g., experience relatively frequent modification). For example, a request for an address of a module can be collected and a relative address can be provided. If a unit upon which the address is dependent experiences a failure, then it can be difficult or impractical to find the module without the unit (e.g., find a network-addressing path). In another example, movement of units (e.g., physically, logically, etc.) can cause relative addresses to become of little use and promote errors in the configuration.

The disclosed innovation can allow an absolute address (e.g., independent address not dependent on a location of another unit) to be provided as opposed to a relative address. For example, the configuration 104 can be implemented in a physical manner. A relative address could state that the module 102 is north of the processor 106, while an absolute address can state that the module is in the northern portion of the configuration 104 (e.g. the configuration is not an actual unit, but an arrangement of different units)—therefore, the module has an address that is independent of the processor location.

To facilitate operation, a directory 108 (e.g., distributed directory) can be employed. Engaged with the directory 108 can be a manager 110 that can communicate with an entity that desires to know an address of the module 102. A discovery component 112 can be used that ascertains an absolute location of a unit (e.g., module 102) in an industrial control configuration (e.g., configuration 104) through use of a directory 108. The directory 108 can retain absolute addresses of various modules of the configuration 104. A query can be collected by the manager 110 for at least one address and a look-up can be performed upon the directory 108. A verification can be performed to ensure that the correct address is discovered (e.g., the manager 110 can test the address to determine if the module 102 is located where the address states) and a transmission component 114 can emit the absolute location to an entity (e.g., a requesting entity, a separate entity designated by a requestor, etc.)

Figure 2:
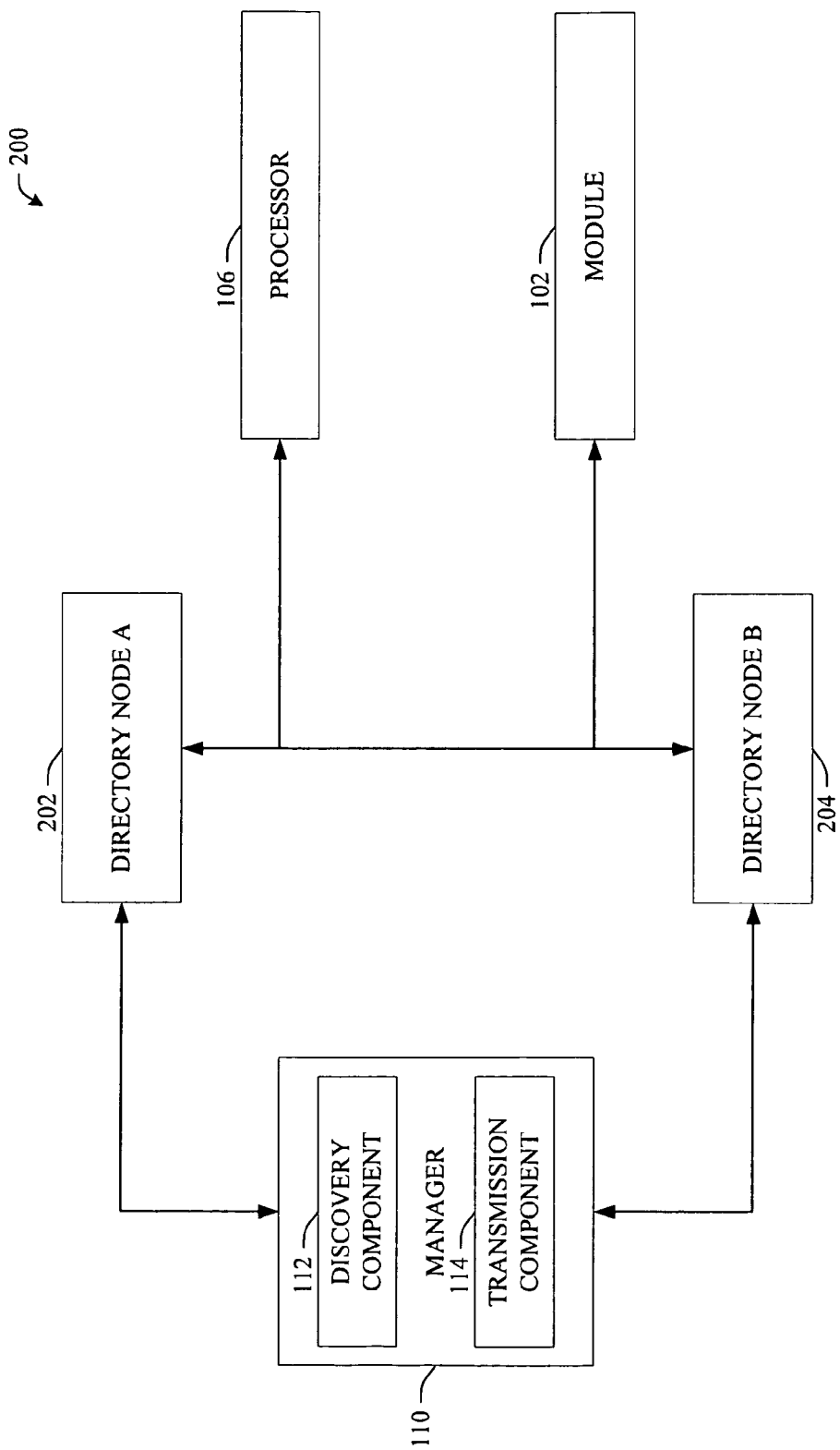
FIG. 2 illustrates a representative absolute address determination configuration with use of a distributed directory in accordance with an aspect of the subject specification.

Now referring to FIG. 2, an example system 200 is disclosed for using a distributed directory in relation to determining an address for a module 102. A manager 110 as well as a discovery component 112 and/or transmission component 114 can engage a distributed directory of an industrial control configuration. The manager 110 can function as a separate device that can easily be removed from the configuration as well as be integrated with the configuration (e.g., function as executable code as part of the directory). An automated request (e.g., periodic address update) can transfer to the manager 110 for an address of the module 102.

The manager 110 can make a determination on if a relative address or absolute address should be supplied. As a default, the manager 110 can function with a presumption that an absolute address should be supplied unless an explicit direction is given that a relative address should be used. In an alternative implementation, the relative address and the absolute address can be provided as a default. The manager 110 can query the distributed directory that includes directory node A 202 and directory node B 204 to determine an appropriate address.

In a distributed directory, information can be propagated upon different nodes where the nodes are configured to retain matching information. A device can place information upon a node and the information can be placed upon other nodes. This can be more secure since there is not a single point of failure (e.g., if node B 204 fails, information can still be retained in node A 202) and can allow for faster response since load-balancing can occur across different nodes.

Several situations can occur when using a distributed directory that can make relative addressing undesirable. For example, different nodes can have a relative address from itself—therefore, a different address can be provided depending on a node asked. Since a purpose of using a distributed directory is different locations of uniform information, having different answers depending on the node asked can become problematic.

In addition, there can be some delay in propagating information from one node to another, thus a relative address has a chance of being incorrect (e.g., a device moves, but information related to the move is not propagated to an asked node). For example, if a relative address is produced in relation to another entity (e.g., a processor 106), then if the processor 106 moves, there can be a delay in propagation upon different nodes. To assist in alleviating this problem, the discovery component 112 can ascertain an address in real-time (e.g., upon collection of an address query). To assist in achieving a quick response time to ensure as accurate of information as possible, the manager 110 can implement as part of the directory.

Figure 3:
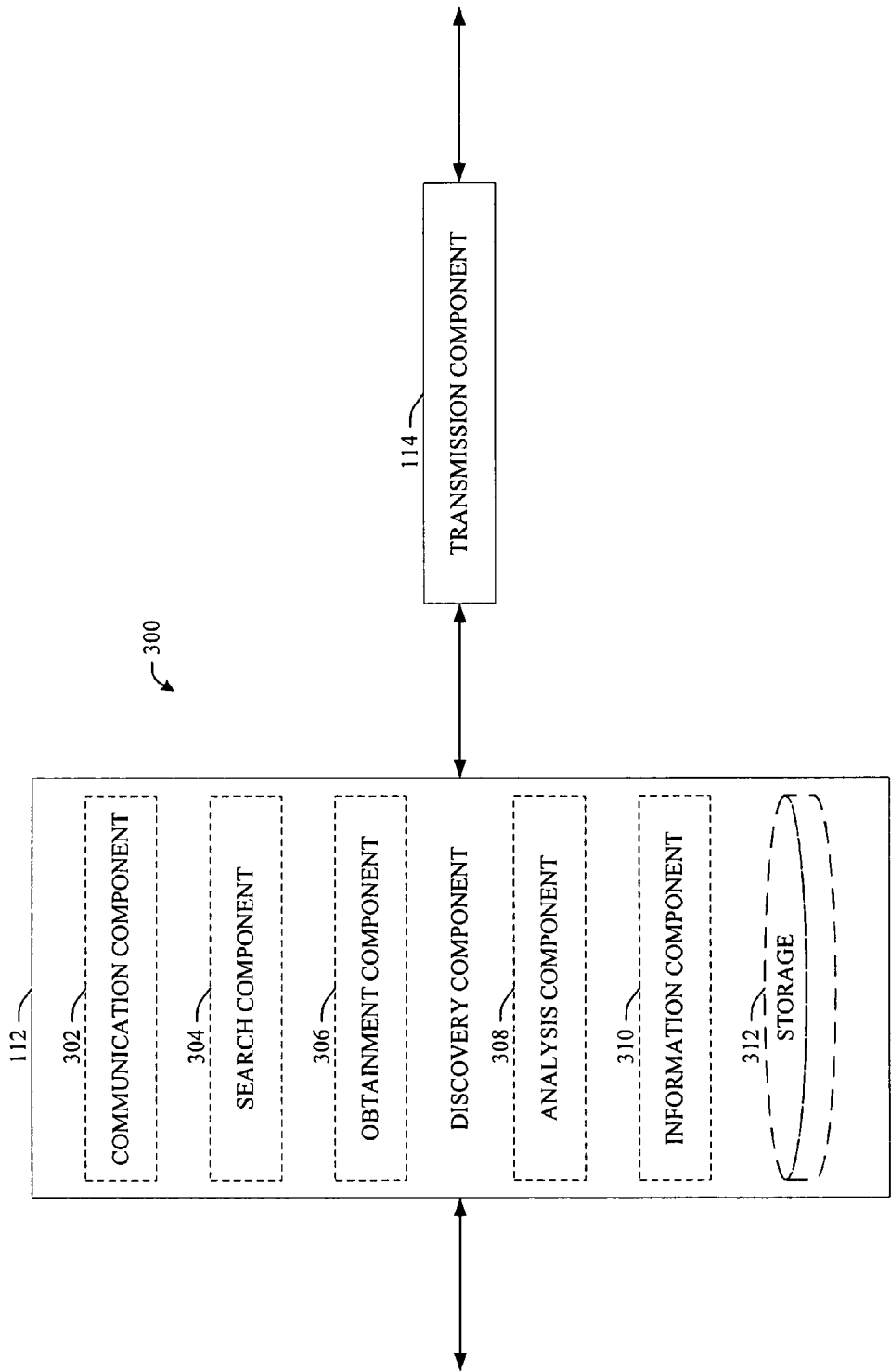
FIG. 3 illustrates a representative absolute address determination configuration with a detailed discovery component in accordance with an aspect of the subject specification.

Now referring to FIG. 3, an example system 300 is disclosed for ascertaining an absolute address of a module in an industrial control configuration with a detailed discovery component 112. The discovery component 112 and a transmission component 114 can function together in an attempt to determine an absolute address. To facilitate operation, the discovery component 112 can use a communication component 302 that can engage with other devices to transfer information, such as to send a request for metadata, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 302 can use various protective features, such as performing a virus scan on collected metadata and avoid usage of metadata that is positive for a virus.

A search component 304 can discover a location of a directory node, a location of potential metadata that can accompany an address response, etc. For example, the system 300 can be operatively coupled to an industrial control configuration. An initial search can be performed to determine a location of a directory node and determine a node from which the system 300 should obtain information (e.g., determining a node that provides a fastest response).

An obtainment component 306 can gather information, evaluate a directory, and the like. In an illustrative instance, a request can be collected by the obtainment component 306 for an address of a module. Information pertaining to the request can be gathered, such as collecting a security level of a requester, collecting an Internet Protocol address of the requestor, obtaining timestamp information pertaining to a request, etc. Filtered gathering can be practiced, such that only information likely to be relevant is collected, information from more reliable sources is gathered first, a limited amount of data (e.g., based upon storage size) is collected, as well as other filtering criteria.

Based upon at least a portion of information collected by the obtainment component 306 (e.g., the request), analysis component 308 can evaluate a request for the absolute location of the unit. Based upon the request, the obtainment component 306 can be employed to collect metadata (e.g., metadata based upon the evaluation) and the communication component 302 can be employed to access a directory node. The discovery component 112 can request that a directory provide an address for a module. If the directory holds address information, then a copy of the address information can be transferred to the discovery component 112. However, if the directory does not include the address, then a search can be performed to find the address and the address can be placed into the directory (e.g., the search component 304 can navigate through the configuration to find the address).

In addition to providing an address, metadata (e.g., gathered by the obtainment component 306) related to a request, the directory, the module, etc. can be transferred to a designated entity. An information component 310 can be employed that identifies metadata for the transmission component 114 to emit based upon a result of the evaluation, the metadata relates to the entity, the unit, a path between the entity and unit, the absolute location, a relative location of the unit, or a combination thereof and the transmission component 114 emits the metadata. According to one embodiment, the evaluation of the analysis component 308 determines a security level of the request, metadata identification is restricted based upon the determined security level.

Different pieces of information, such as collected metadata, component operating instructions (e.g., communication component 302), components themselves, etc. can be held on storage 312. Storage 312 can arrange in a number of different configurations, including as random access memory, battery-backed memory, Flash memory, hard disk, magnetic tape, etc. Various features can be implemented upon storage 312, such as compression and automatic back up (e.g., use of a RAID configuration). In addition, storage 312 can operate as memory that can be operatively coupled to a processor. Storage 312 can implement as a storage component and house collected metadata (e.g., metadata collected from the obtainment component 306). A computer program embodied upon a computer-readable medium (e.g., storage 312) can be used that includes program code for determining a response to a query upon a module for location information of the module in real-time and program code for transmitting an address of the module and a path to the module as the response.

Figure 4:
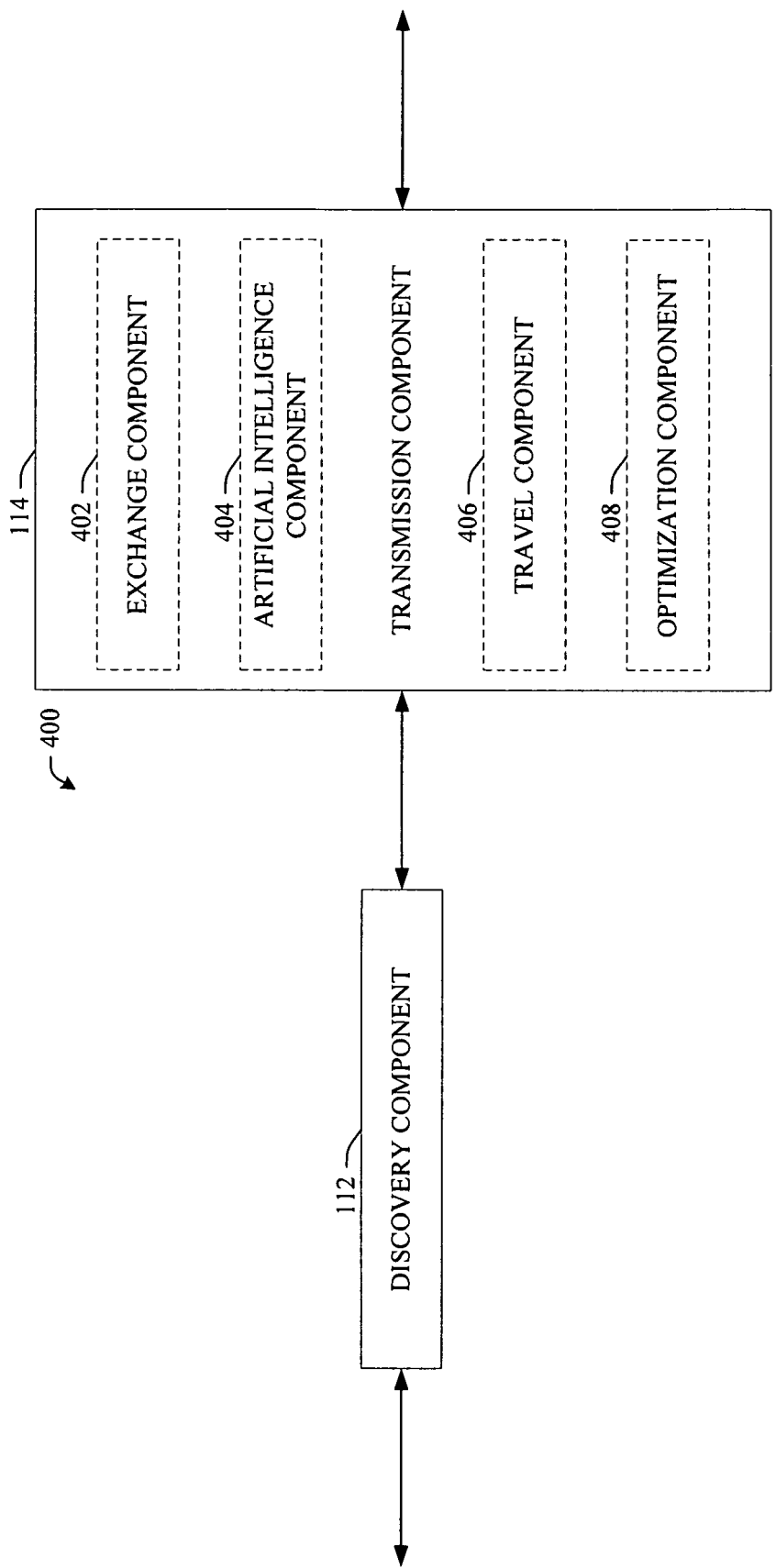
FIG. 4 illustrates a representative absolute address determination configuration with a detailed transmission component in accordance with an aspect of the subject specification.

Now referring to FIG. 4, an example system 400 is disclosed for emitting an absolute address of a module in an industrial control configuration with a detailed transmission component 114. A discovery component 112 can ascertain an address of a module and the transmission component 114 can emit the ascertained address. Various components can assist in operation and/or provide additional content to an intended destination of the emission.

It is possible that a distributed directory be employed to discover the address uses relative addressing. An exchange component 402 can be used that converts a relative address of the unit to the absolute location, the ascertainment of the discovery component 112 is made by accessing the converted absolute location. For example, the distributed directory can provide a relative address to the exchange component 402. The exchange component 402 can use the relative address to determine the absolute address, such as through performing an analysis upon a topographical map of the configuration. The transmission component 114 can transfer the absolute address determined by the exchange component 402.

An artificial intelligence component 404 can be used to facilitate determinations of the system 400. It is to be appreciated that artificial intelligence techniques can be used to practice determinations and inferences disclosed in the subject specification. The artificial intelligence component 404 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 404 can also include methods for capture of logical relationships such as theorem provers or more heuristic rule-based expert systems. The artificial intelligence component 404 can be represented as an externally pluggable component, in some cases designed by a disparate (third) party.

One piece of information that can be beneficial to provide is a path on how an entity can reach a module retained at the absolute location. A travel component 406 can be employed that determines a path between the entity and the unit (e.g., a requesting unit, a unit identified by a requester, the system 400, etc.), the transmission component 114 emits the path to the entity. According to one embodiment, the travel component 406 uses a topographical map of at least a portion of the industrial control configuration to determine the path (e.g., used in conjunction with the obtainment component 306 of FIG. 3). The distributed directory can create and retain the topographical map (e.g., in storage 312 of FIG. 3). When a change is experienced in the configuration, the directory can automatically update the map.

Various aspects disclosed herein can be performed in an improved manner. Thus, an optimization component 408 can be employed to produce improved results from various components, thus optimizing performance and/or results. For example, a relatively large number of paths can be determined from use of the topographical map. The optimization component 408 can model the configuration to determine an improved path (e.g., a fastest path, a path with lowest probability of failure, a superlative path, etc.), the improved path is emitted by the transmission component 114. According to other example implementations, the optimization component 306 can facilitate the search component 304 to perform searches in a shortest amount of time through using a cache of reliable information locations, verify an absolute address determined by the exchange component 402 (e.g., by checking if the module is actually located at the absolute address), etc.

Figure 5:
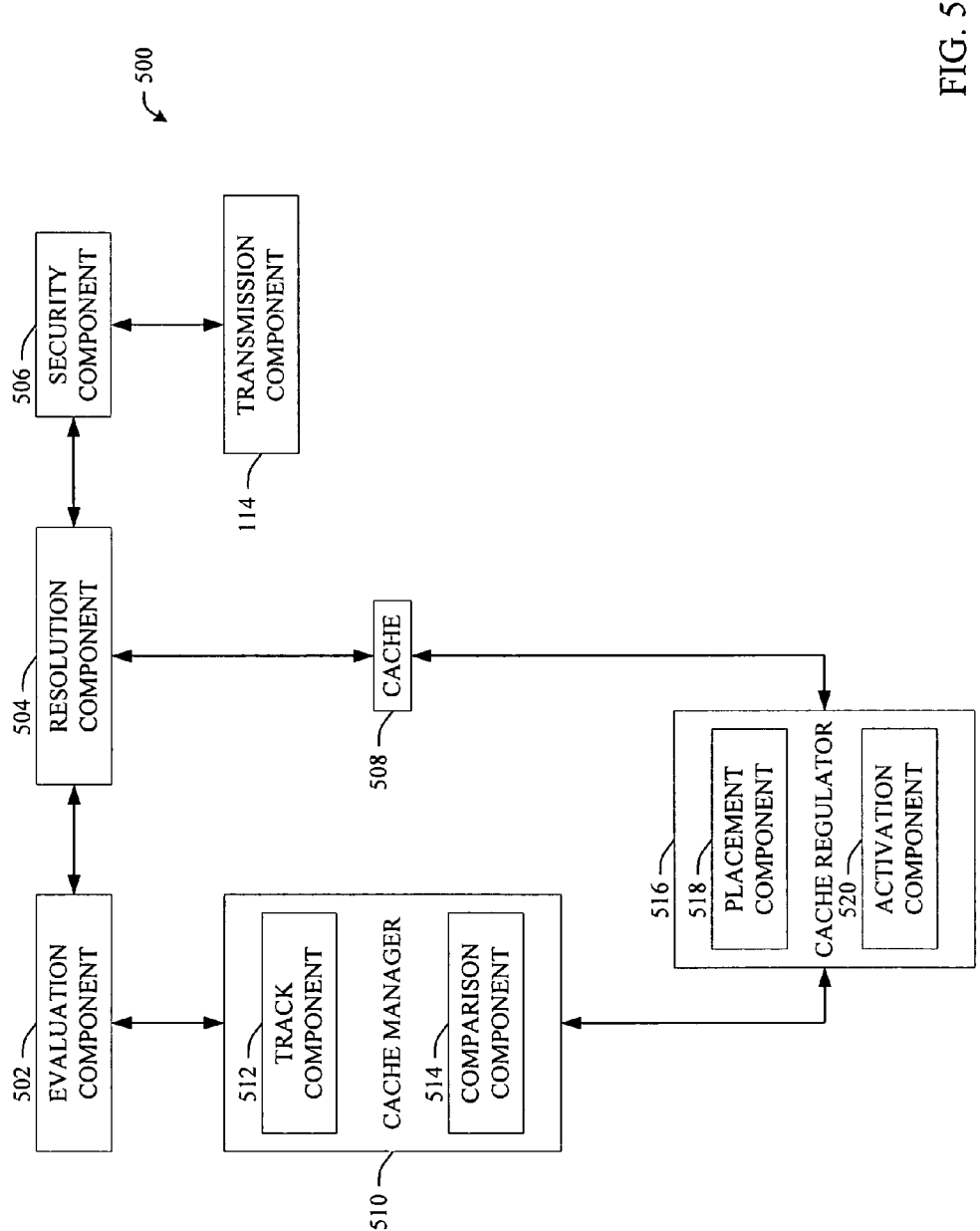
FIG. 5 illustrates a representative real-time absolute address determination configuration in accordance with an aspect of the subject specification.

Now referring to FIG. 5, an example system 500 is disclosed for real-time resolution of a query (e.g., absolute address query). A query can be run upon a directory (e.g., distributed directory) of an industrial control configuration. An evaluation component 502 can collect the query and perform analysis to determine characteristics of the query (e.g., why the query is run, who transferred the query, and the like). The evaluation component 502 can function as means for evaluating a query toward the directory of the industrial control configuration.

A resolution component 504 can attempt to resolve the query based upon a result of the evaluation and provide a result, a partial result, an error message, etc. Resolution can be performed by running a search upon the directory, asking the directory to perform a response, verify a response, etc. The resolution can be in real-time (e.g., since being based upon the result of the evaluation, there can be real-time evaluation). The resolution component 504 can operate as means for resolving the query based upon a result of the evaluation.

It is possible that an answer to the query can be sensitive in nature. For example, the answer can be proprietary information that third-party entities should not obtain. A security component 506 can be employed to regulate information dissemination through restricting access. The security component 506 can operate as means for determining a security level of an entity that produces the query, the means for resolving functions upon determining that the entity has an appropriate security level. There are a variety of different manners that the security component 506 can operate. This can include performance of an initial check before evaluation occurs, perform a check based upon a result of the evaluation, perform a check based upon an answer determined by the resolution component 504, or a combination thereof. In addition, there can be analysis of a result of the check and determine if access should be completely denied, restricted, or allowed (e.g., by comparing an access rights level of a requester or intended receiving entity against an access rights level of the configuration, directory, information portion, or a combination thereof). The answer to the query can be transferred to an intended destination by a transmission component 114 (e.g., upon approval from the security component 506).

It is possible that there are a number of popular queries run upon the configuration and/or an answer that is a popular response. Therefore, a cache 508 can be employed to retain information that a common answer of a query. A cache manager 510 can be employed to determine if an answer is used frequently enough to merit placement in the cache 508. A track component 512 can be used that counts a number of times an answer is determined by the resolution component 504. The track component 512 can be employed as a means for counting a number of times the query is made. The counted number can be retained in storage 312 of FIG. 3 and a comparison component 514 can compare different numbers against one another to determine if an answer should be placed in the cache 508 (e.g., a highest numbered counter can have an associated answer selected). Comparison against other numbers can be used in a situation where a limited amount of answers can be retained in the cache 508. According to another embodiment, if a certain number is reached in an amount of time, the comparison component 514 can determine an answer should be retained in the cache 508 (e.g., cache dedicated to answer retention, shared cache, etc.). In addition, the comparison component 514 can perform more direct balancing, such as using a number as one factor in determining if placement is appropriate—other factors can include size of an answer, stability of an original location of the answer, and the like. The comparison component can operate as means for determining if the number is sufficient to warrant placement of an answer to the query in a cache 508.

If it is determined that an answer (e.g., a piece of information) should be placed in the cache, a cache regulator 516 can be employed. A placement component 518 can place information designated by the comparison component 514 into the cache. In addition, the placement component 518 can remove information from the cache (e.g., to create space for the placed answer). A determination can be made on if information should be removed from the cache 508 (e.g., to make room for new information, information not being accessed as an answer frequently enough, etc.); the placement component 518 can remove designated information based upon a positive determination. The placement component 518 can implement as means for placing the answer in the cache.

Since the resolution component 504 should resolve answers in real-time, information in the cache 508 can be updated when appropriate. An activation component 520 can monitor a source of information placed in the cache (e.g., a controller that has an address, the address is stored in the cache 508) and identify a change. The activation component 520 can propagate the change upon the cache 508 such that the activation component 520 functions as means for enabling the answer to be updated.

Figure 6:
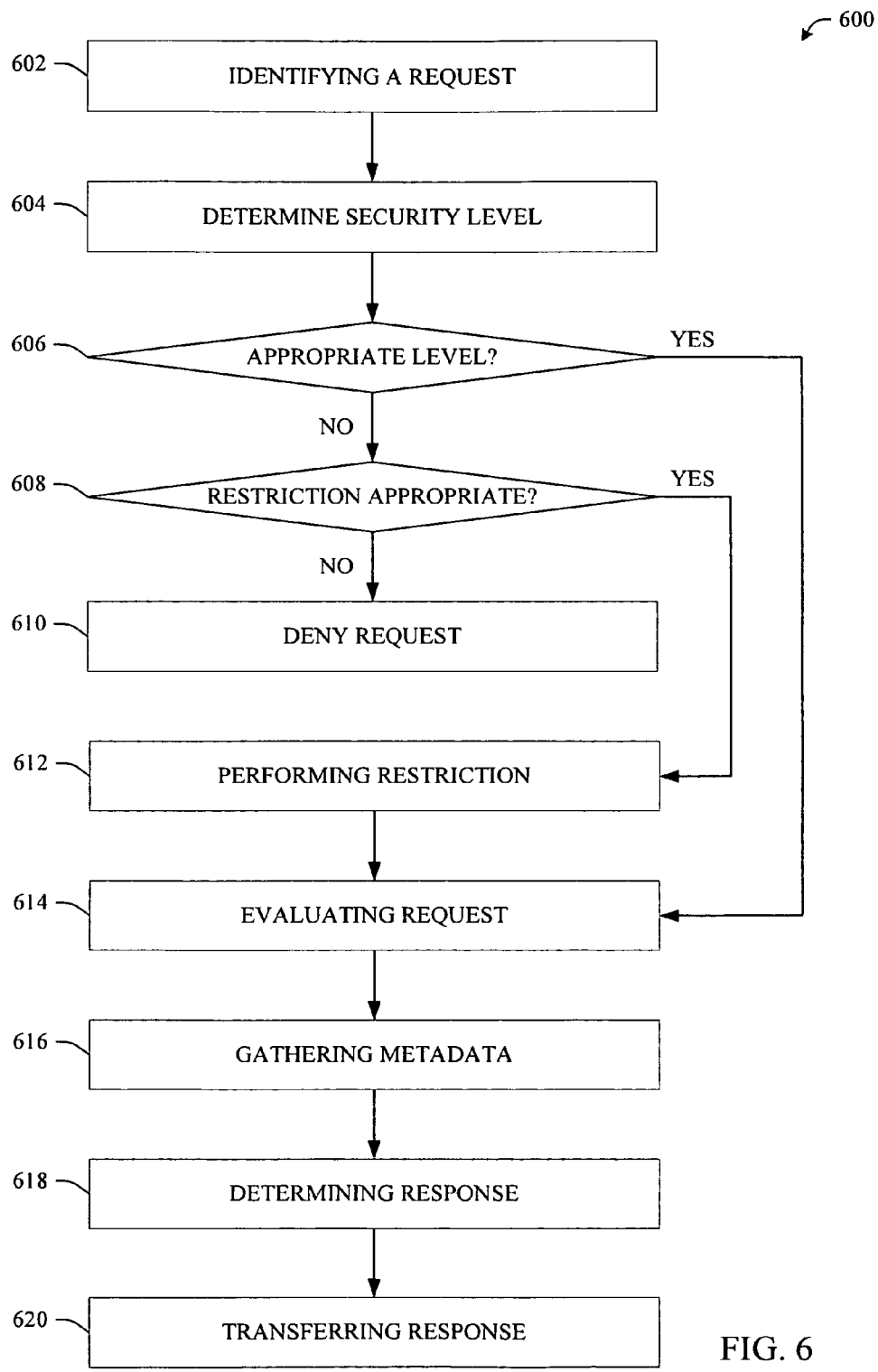
FIG. 6 illustrates a representative methodology for responding to a request for an absolute address of a module in accordance with an aspect of the subject specification.

Now referring to FIG. 6, an example methodology 600 is disclosed for processing an information request regarding an industrial control configuration. At action 602, there can be identifying a request to a directory (e.g., distributed directory) for a location (e.g., relative location, absolute location) of a module of the industrial control configuration. In addition to identifying the request, metadata can be identified pertaining to the request, such as who sent the request, what time the request is sent, relevant contextual information, and the like.

A security level of the configuration and the request can be determined at event 604. For example, a requesting entity can have universal access rights and thus there be no restriction on what can be viewed. Also, information can be free to access unless it is associated with a restriction level. A check 606 can take place to determined if a request is associated with an appropriate level. It is possible that a requestor sends a request for a query to locate an address, yet the address be transferred to a different location (e.g., a third-party software module requests a transfer of an address to a controller). The security level used can be based upon a level of a requester, a level of a destination, etc. Moreover, further disclosure of information can be limited based upon security. For example, a third-party device can request a location name be transferred to a controller. The controller can be restricted such that the information is not further forwarded; thus, a third-party device can manage information distribution without learning of the information (e.g., to protect proprietary information).

If it is determined at check 606 that an appropriate security level is not held, then a check 608 can determine if there can be restricted information disclosure. For example, there can be a request for an address of a module and a path to reach the module. Restriction can occur such that the address is disclosed, but not the path so the requestor does not learn of how a configuration is implemented. If restriction is not appropriate (e.g., all information should not be disclosed, restriction is not practical, restriction is not allowed by a rules set, etc.), then the request can be denied and an appropriate message sent at act 610. However, if restriction is appropriate, then the restriction can occur at event 612.

If there is an appropriate security level (e.g., from check 606) as well as if proper restriction occurs, there can be evaluating the request at act 614. Based upon the request, there can be gathering metadata after the request is identified pertaining to the module at action 616. With the metadata, there can be determining a response such that there is responding to the request with an address of the module and a path to reach the module at event 618. Event 618 can also operate as determining the address upon identifying the request. The gathered metadata can include analyzing a topographical map to determine the path such that the gathered metadata is used in determining the path.

According to one embodiment, the metadata is gathered from a directory, where the directory includes executable code that determines the path. The executable code can determine an improved path, the improved path is shortest in access time between a requester and the module, has lowest impact upon the industrial control configuration, is the most secure, or a combination thereof. The response can transfer to an appropriate entity at act 620.

Figure 7:
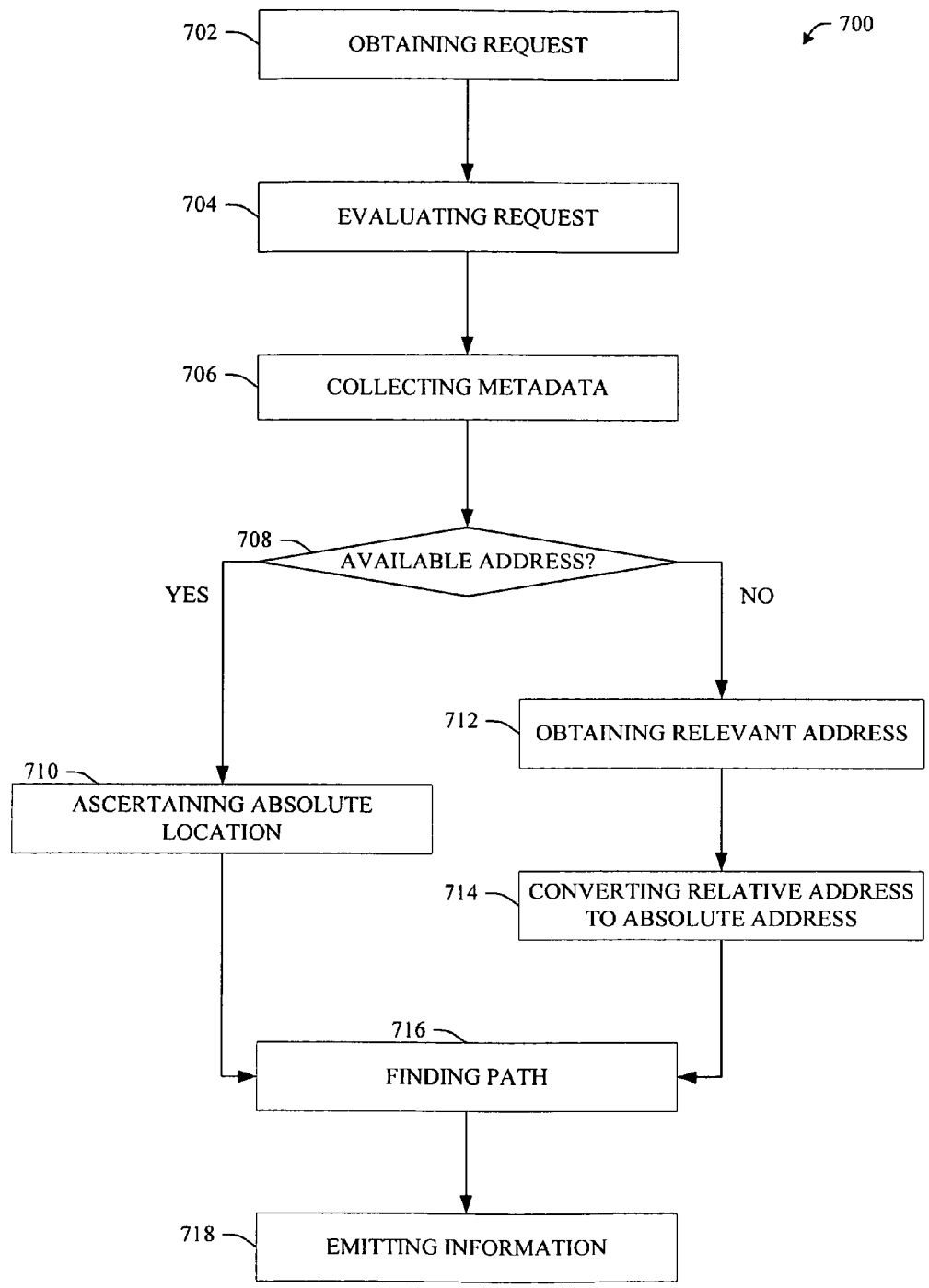
FIG. 7 illustrates a representative methodology for supplying a path and absolute address concerning a module in accordance with an aspect of the subject specification.

Now referring to FIG. 7, an example methodology 700 is disclosed for providing an address for a location of an entity implemented upon an industrial control configuration. A request to run a query (e.g., to determine an absolute address) can be obtained at act 702. The request can be evaluated at action 704 to determine characteristics of the request, such as why the request is sent, in intended use of an answer to the request and/or query, and the like.

Metadata collection can occur in conjunction with the request at event 706—part of the metadata collection can include running the query. Based upon a result of the evaluation, different types of metadata can be collected. For example, the evaluation can result in a determination that the request is to locate an address of a controller so information can be transferred to the controller. An inference can be drawn that there can be benefit in providing a path to the controller since there is an intention of information transfer. Metadata can be collected on how the configuration implements so when an address is discovered, an appropriate path can be found.

The query can be run in order to discover an absolute address of a module. A check 708 can be performed to determine if an absolute address is available. This can be performed through running executable code in a directory to determine if the directory retains the absolute location of the module. If the directory does include the absolute location, then the location can be ascertained at act 710 (e.g., transferred to a processor).

However, it can be determined that the absolute address is not available through the directory, but the directory can include a relative address. The relative address can be accessed from the directory thought event 712. Based upon a relative address, a search can occur to locate the module and thus determine the absolute address. The relative address can be converted to an absolute address at act 714—in one implementation, the absolute address can replace the relative address in the directory.

With the absolute address, a path to reach the module can be found at action 716 and optimized. More metadata can be collected pertaining to a path for the entity to take to reach the controller at the absolute address (e.g., based upon a location of a requesting entity that is collected). Metadata filtering can occur such that relevant information can be transferred in conjunction with the absolute address and/or path. The absolute address, the path found at action 716, and/or relevant metadata can be emitted through act 718.

Figure 8:
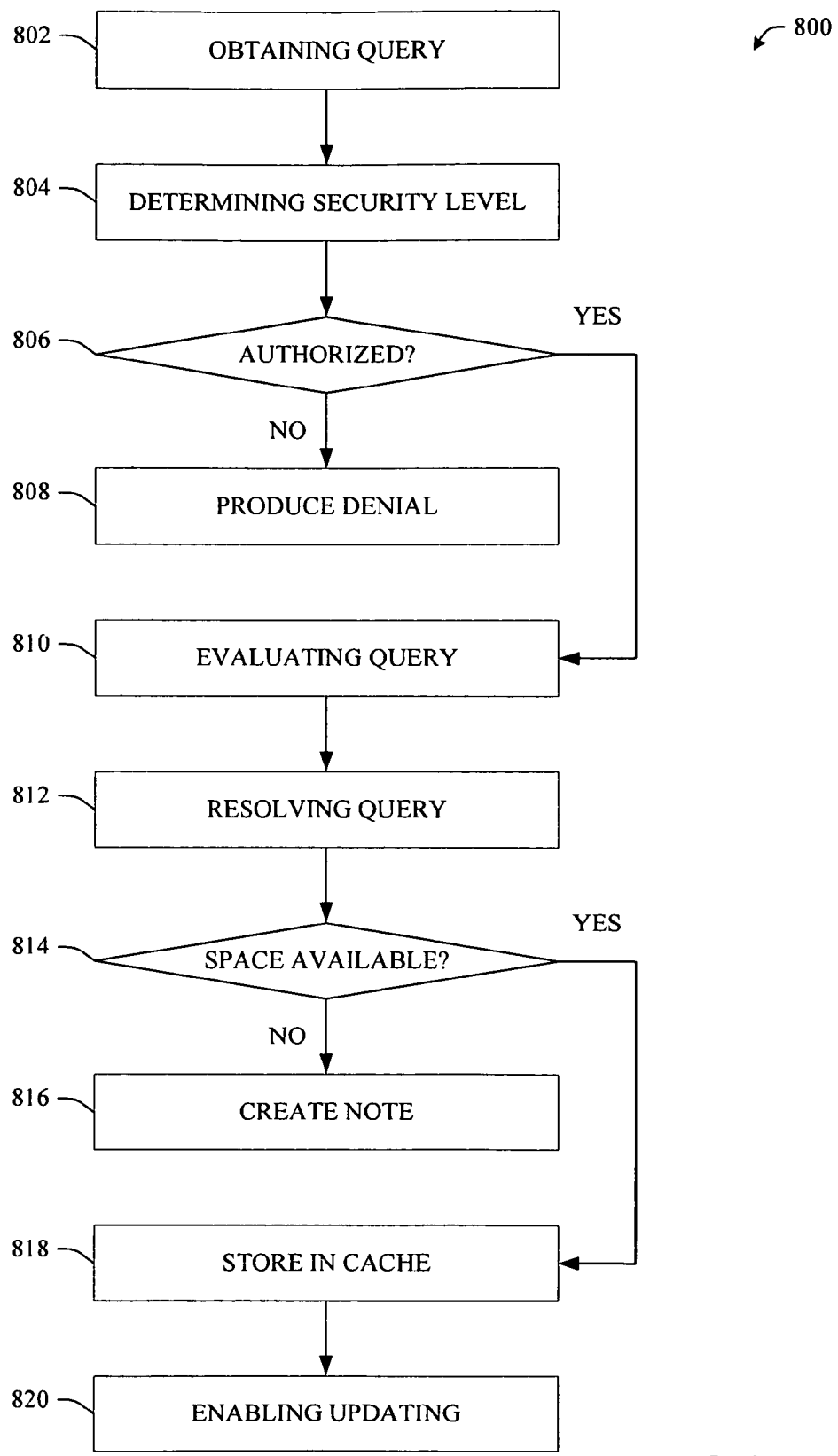
FIG. 8 illustrates a representative methodology for real-time query resolution in accordance with an aspect of the subject specification.

Now referring to FIG. 8, an example methodology 800 is disclosed for using a cache in relation to answering a query in an industrial control configuration. A query for running upon a directory (e.g., to discover a location of a module) can be obtained at action 802. In addition to obtaining the request, various characteristics related to the request can also be obtained. For example, a method used to make the request (e.g., mobile device, automated request, etc.) can be ascertained.

A security level of the query can be determined at event 804. A check 806 can be performed to determine if the query is authorized to be run upon the directory. If the check makes a negative determination (e.g., access rights of a requestor are not high enough, access rights of a requestor are not known, etc.), then a denial to the query can be produced at event 808. An example denial can include a message sent to a requestor stating that the query is not completed and can include a reason for a denial. While discussing security measures, it is to be appreciated that other checks can be produced to determine if the query should be run. For example, a check can be performed if the directory is available, if there is too much traffic on the directory (e.g., there is a relatively high number of other queries being run, etc.), if a query cannot be understood, etc. With the denial, an interactive option can be provided—for example, a requestor can be presented with a denial and an option to provide further information that can resolve the denial (e.g., ask for a password).

If the check 806 states that there is authorization, then there can be evaluation of the query at action 810 that determines at least in part for what the query is asking. Based upon a result of the evaluation, the query can be resolved through event 812. It is possible that the directory does not include an answer to the query (e.g., a module is newly added and has not yet populated through the directory and/or directory nodes). As part of resolving the query, a determination can be made on the answer even if the answer is not part of the directory—with the answer known, the answer can transfer to an intended destination and the answer can be populated upon the directory for future queries.

To improve operation, a cache of information can be used to retain frequently used pieces of information (e.g., common answers). According to one embodiment, a check 814 can be performed to determine if there is space available in a cache to retain the answer. If there is not available space, then a note can be created at event 816 that an evaluation of the cache should occur. In the evaluation, it can be determined if the answer should replace other information—once the determination is made, actions in accordance with the determination can occur (e.g., managing storage in the cache) and the note can be deleted.

However, if there is space available, then the answer can be placed in the cache at act 818. Overall, a greater management aspect can be practiced, such that as much of the cache is used as possible (e.g., smaller answers can be placed that are less frequently used if there is space available). Answers in the cache can be configured such that automatic updating can occur if the basis for the answer changes at action 820.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
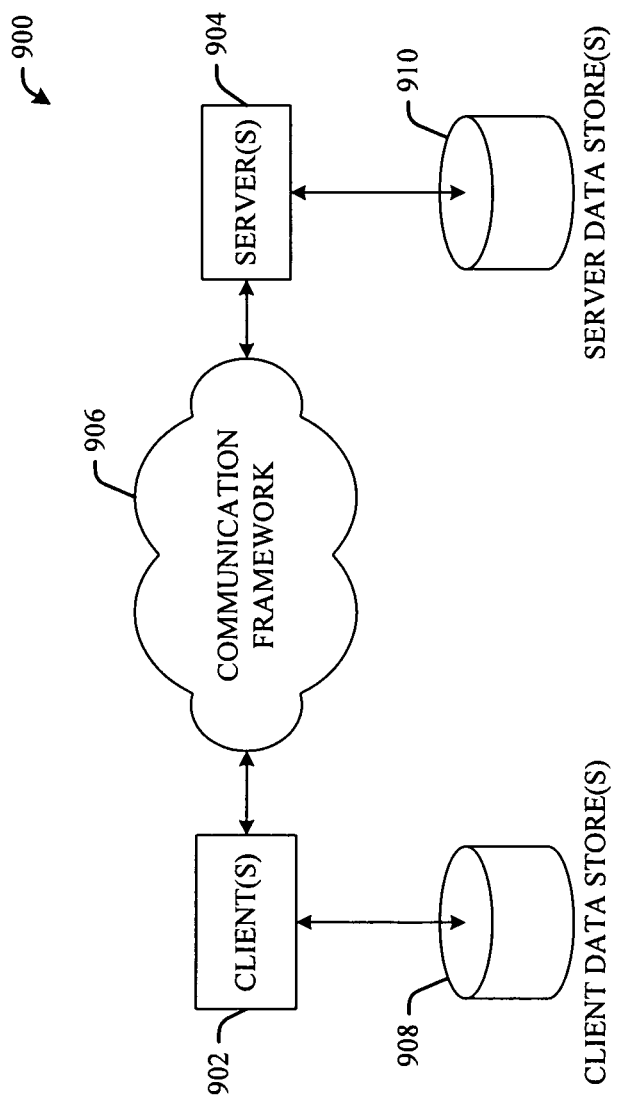
FIG. 9 illustrates an example of a schematic block diagram of a computing environment in accordance with an aspect subject specification.
Figure 10:
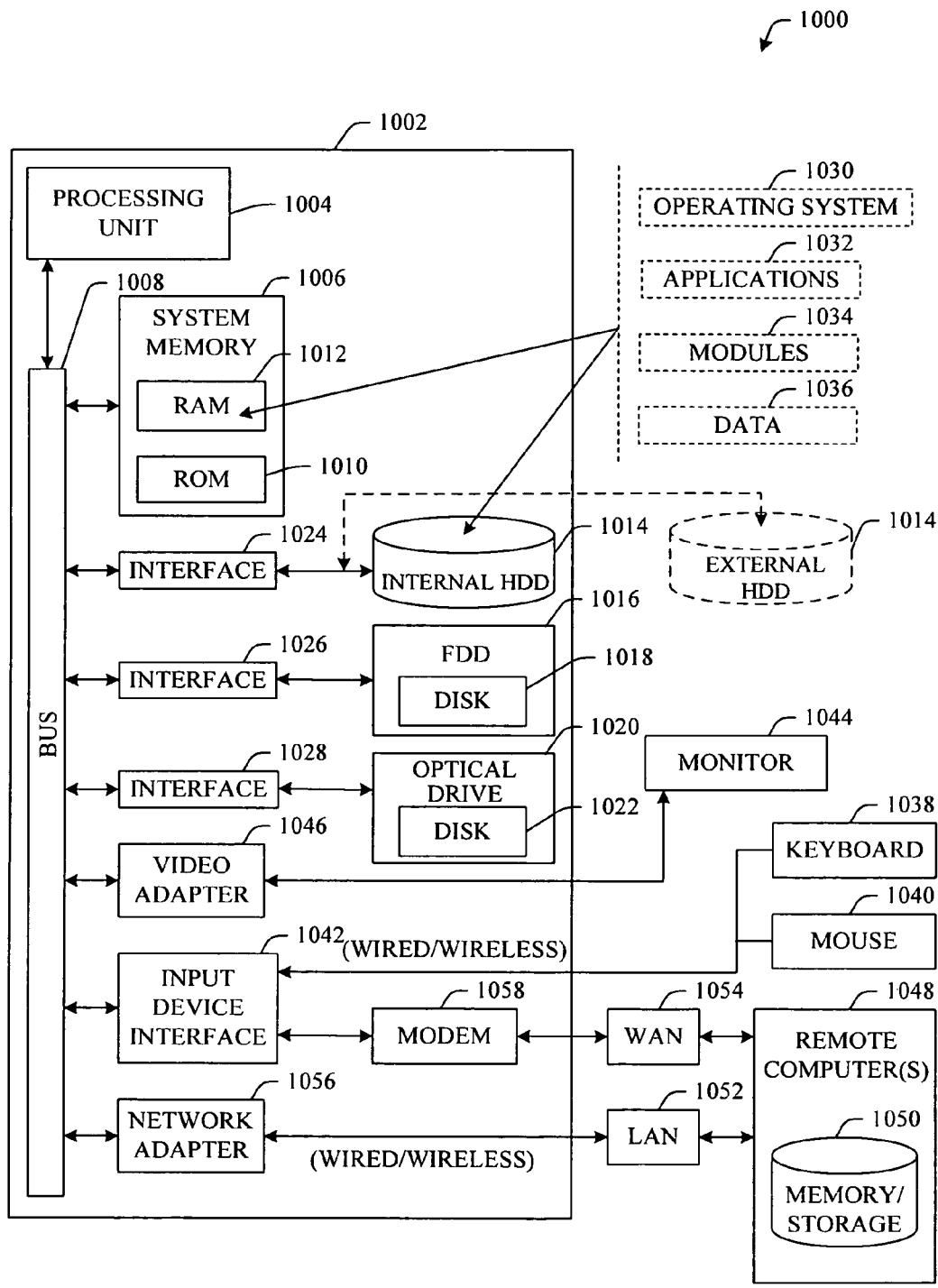
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory that stores instructions; and
   a processor that facilitates execution of the instructions to at least:
      query a plurality of nodes of a distributed directory for a logical absolute address of a unit in an industrial control configuration, wherein each of the plurality of nodes stores a copy of the logical absolute address of the unit;
      determine a node of the plurality of nodes from which to receive the logical absolute address of the unit based on a security level of a requesting entity;
      retrieve the logical absolute address of the unit from the node of the plurality of nodes;
      test the logical absolute address of the unit to verify that the unit is located at the logical absolute address; and
      transmit the verified logical absolute address to the requesting entity.

2. The system of claim 1, wherein the processor further facilitates the execution of the instructions to convert a relative address of the unit to the logical absolute address, wherein the relative address depends on a second unit and the logical absolute address is independent of the second unit.

3. The system of claim 1, wherein the processor further facilitates the execution of the instructions to determine a path between the requesting entity and the unit based on the logical absolute address and transmit the path to the requesting entity.

4. The system of claim 3, wherein the processor further facilitates the execution of the instructions to determine the path based on a topographical map of a portion of the industrial control configuration.

5. The system of claim 1, wherein the processor further facilitates the execution of the instructions to:
   identify metadata from the unit related to the entity based on information about the requesting entity; and
   transmit the metadata to the requesting entity with the logical absolute address.

6. The system of claim 5, wherein the processor further facilitates the execution of the instructions to:
   determine the security level of the requesting entity; and
   identify the metadata based on the security level.

7. A method, comprising:
   receiving, by a system including a processor, a request for a location of a module in an industrial control configuration from an entity;
   querying, by the system, a plurality of nodes of a distributed directory for a location of the module in the industrial control configuration, wherein at least two of the plurality of nodes stores the location of the module;
   retrieving, by the system, the location of the module in the industrial control configuration from one of the at least two of the plurality of nodes;
   verifying, by the system, that the module is located at the location;
   determining a path to the location to facilitate communication with the module from the entity; and
   responding, by the system, to the request from the entity with the path to the location of the module.

8. The method of claim 7, further comprising determining, by the system, the path according to a logical absolute address of the location.

9. The method of claim 7, further comprising determining, by the system, the path shortest in access time between a requestor and the module or that has a lowest impact on the industrial control configuration.

10. The method of claim 7, further comprising:
collecting, by the system, metadata pertaining to the module; and
determining, by the system, the path based on the metadata.

11. The method of claim 7, further comprising:
identifying, by the system, a relative address of the module with respect to the entity,
wherein at least two of the plurality of nodes stores the location of the module.

12. A non-transitory computer-readable storage medium having stored thereon computer-executable instructions that, in response to execution, cause a system to perform operations, comprising:
querying a plurality of nodes of a distributed directory for a location of the module in the industrial control configuration;
retrieving the location of the module in the industrial control configuration from a node of the plurality of nodes, wherein each of the plurality of nodes stores the location;
testing the location of the module to verify that the module is located at the location;
determining a path to the module from a requesting entity based on the location, wherein the path comprises a logical absolute address of the module.

13. An apparatus, comprising:
a memory that stores instructions; and
a processor that facilitates execution of the instructions to at least:
query a plurality of nodes of a distributed directory for an address of a unit in an industrial control configuration, wherein at least two of the plurality of nodes stores the address of the unit;
retrieve the address of the unit from a node of the plurality of nodes based on a property of the requesting entity;
verify that the unit is located at the address; and
transmit the address to the requesting entity.

14. The apparatus of claim 13, wherein the address comprises a relative address and the processor further facilitates the execution of the instructions to convert the relative address to an absolute logical location, wherein the relative address depends on a second unit and the absolute logical location is independent of the second unit.

15. The apparatus of claim 13, wherein the processor further facilitates the execution of the instructions to determine a path between the entity and the unit based on the address and transmit the path to the requesting entity.

16. The apparatus of claim 15, wherein the processor further facilitates the execution of the instructions to determine the path based on a topographical map of a portion of the industrial control configuration.

17. The apparatus of claim 13, wherein the address comprises a logical absolute address that is independent of a location of another unit within the industrial control configuration.

* * * * *